US005477224A

United States Patent [19]

Sinnock

[11] Patent Number: 5,477,224

[45] Date of Patent: Dec. 19, 1995

[54] RADAR ARRANGEMENTS AND METHODS

[75] Inventor: Peter J. Sinnock, West Lothian, Scotland

[73] Assignee: Racal (Newbridge) Limited, United Kingdom

[21] Appl. No.: 329,527

[22] Filed: Dec. 4, 1981

[30] Foreign Application Priority Data

Dec. 4, 1980 [GB] United Kingdom .................... 8038602

[51] Int. Cl.$^{6}$ ............................ H01Q 15/14; G01S 13/72

[52] U.S. Cl. .............................. 342/5; 342/158; 342/139; 342/140

[58] Field of Search .................................... 343/5 R, 757, 343/761; 342/5, 74, 139, 140, 158

[56] References Cited

FOREIGN PATENT DOCUMENTS

| | | |
|---|---|---|
| 460490 | 1/1937 | United Kingdom . |
| 814921 | 6/1959 | United Kingdom . |
| 817714 | 8/1959 | United Kingdom . |
| 838574 | 6/1960 | United Kingdom . |
| 1163310 | 9/1969 | United Kingdom . |
| 1243083 | 8/1971 | United Kingdom . |
| 1488590 | 2/1977 | United Kingdom . |
| 1472139 | 5/1977 | United Kingdom . |

*Primary Examiner*—John B. Sotomayor
*Attorney, Agent, or Firm*—Larson and Taylor

[57] ABSTRACT

A radar arrangement has a transmitter/receiver unit which is rotatable and has an aerial projecting an elongate radar beam onto a reflector which rotates therewith. The reflected beam therefore scans the target area. Target reflections are reflected by the reflector on to the aerial for detection thereby. The reflector is switchable about the vertical axis through 90° with respect to the aerial. In one position, the beam is therefore projected into, and scans, the target area with its elongate dimension vertical (so as to be best suited to detect rapidly approaching targets of small aspect such as aircraft or missiles), and in the other position the beam is projected into, and scans, the target area with its elongate dimension horizontal (so as to be best suited to detect intermittent targets appearing in relatively slow moving positions such as the rotor blades of a helicopter).

22 Claims, 7 Drawing Sheets

RADAR ARRANGEMENTS AND METHODS

BACKGROUND OF THE INVENTION

The invention relates to radar arrangements and methods.

BRIEF SUMMARY OF THE INVENTION

According to the invention, there is provided a radar arrangement capable of producing two radar beams from a single aerial system, the .beams having different cross-sectional shapes relative to the aerial system.

According to the invention, there is also provided a radar arrangement having a single scannable transmitting aerial system and capable of producing therefrom, in two different operating modes, respective radar beams having different characteristics.

According to the invention, there is further provided a radar arrangement comprising a single transmitting aerial system emitting a radar beam of narrow elongate shape, a reflector for reflecting the beam into a target area, means for turning the aerial and the reflector bodily together to scan the emitted beam through at least part of the said area, and means for turning the reflector relative to the aerial system so as to turn the reflected beam between two positions and switch the arrangement between corresponding operating modes.

According to the invention, there is still further provided a radar arrangement comprising a base, mechanical driving means mounted on the base, a transmitter/receiver unit mounted on the base so as to be angularly movable relative to the base by the driving means about a first axis which is vertical when the base is standing on a horizontal plane, there being no high frequency connections to the transmitter/receiver, a transmitting and receiving aerial system mounted on and rotating with the transmitter/receiver unit and arranged to emit a radar beam which is of predetermined elongate shape in cross-section, a reflector, mounting means mounting the reflector above the aerial system and at an angle both to the vertical and horizontal axes so as to receive the emitted beam and to reflect it in a generally horizontal direction into a target area, the mounting means mounting the reflector so that it turns bodily with the angular movement of the transmitter/receiver unit about the vertical axis and thereby scans the reflected beam through the target area and being also capable of turning the reflector through substantially 90° with respect to the vertical axis and relative to the aerial system whereby to turn the reflected beam through a corresponding angle and thereby to switch the radar arrangement between first and second operating modes.

DESCRIPTION OF THE DRAWINGS

Radar arrangements embodying the invention, and methods according to the invention will now be described by way of example and with reference to the accompanying diagrammatic drawings in which.

DESCRIPTION OF PREFERRED EMBODIMENTS

Figure 1:
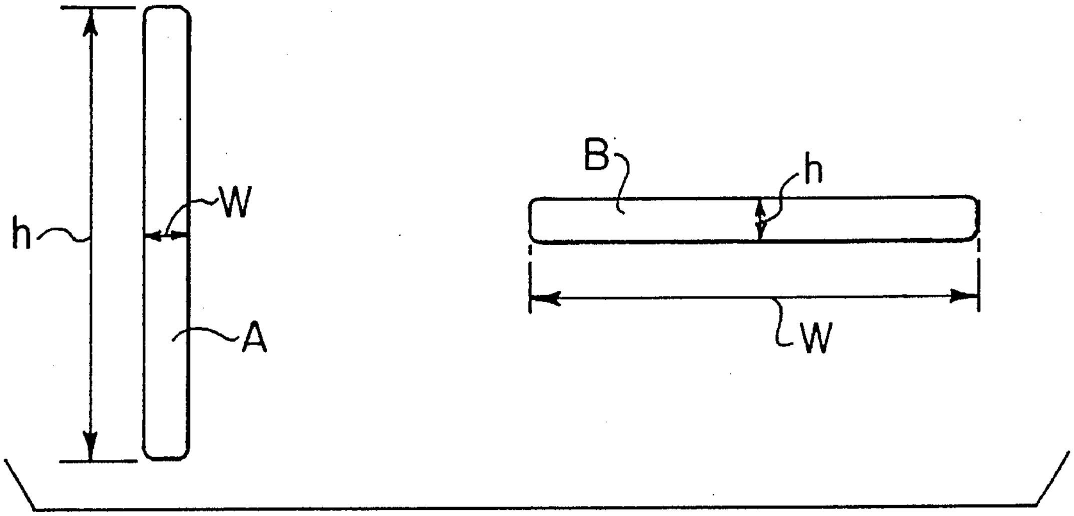
FIG. 1 shows diagrammatically the shapes of two radar beams produced by the radar arrangement.

The radar arrangement now to be more specifically described is intended to produce two different radar beam patterns from a single scanning aerial arrangement. As shown in FIG. 1, the first of these patterns is Pattern A having, in one example, a width, w, of 0.7° and a height, h, of 12°. The second pattern is Pattern B which, in one example, has a width, w, of 12° and a height, h of 0.7°, and therefore represents Pattern A turned through 90°.

In a manner to be explained, the radar arrangement is switchable between two modes, a "A" mode in which it produces Pattern A and a "B" mode in which it produces Pattern B. When in the A mode, tire radar arrangement is therefore optimised for detecting rapidly approaching targets such as low flying aircraft (assuming that the beam is projected with its lower edge substantially horizontal with respect to the general plane of the earth's surface). Assuming that the rate of scanning is sufficiently fast, the Pattern A of the radar beam will be able to detect (that is, produce radar reflections from) rapidly approaching targets at considerable distances, when they will clearly have a very small aspect.

In contrast, when the arrangement is in the B mode, it will be optimised for detecting intermittent low level relatively slow moving targets such as helicopters, particularly in operational conditions in which it may be that only the rotating rotor blades of a partially hidden hovering helicopter are visible to the radar arrangement. The wide aspect of Pattern B is therefore appropriately shaped to detect (produce radar reflections from) such rotor blades and its height is sufficient to cover a reasonable range of hovering positions of the helicopter. As will be explained in more detail, however, when operating in the B mode the radar arrangement can be arranged to produce Pattern B at successively different angles to the general plane of the earth surface.

Figure 2:
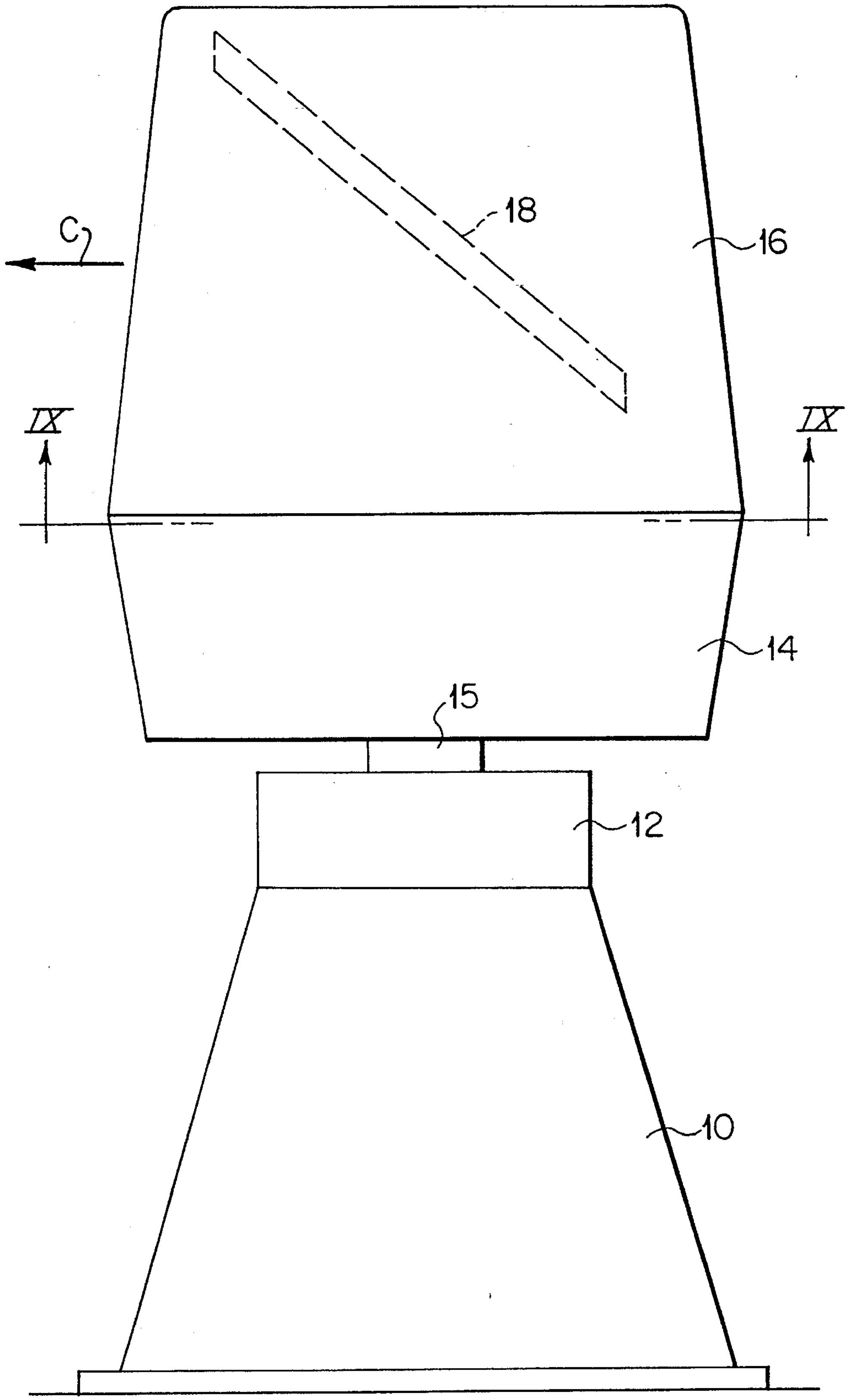
FIG. 2 is a side elevation of the arrangement.

FIG. 2 shows a side elevation of the radar arrangement.

As shown, it has a stand 10 supporting it from the ground 11. On top of the stand is a drive unit 12. A transmitter/receiver unit 14 is mounted on the drive unit 12 so as to be driven by the unit 12, via a drive connection 15, about the vertical axis. For this purpose, the unit 12 incorporates a suitable drive motor.

The transmitter/receiver unit 14 carries a radome 16 which therefore rotates with the unit 14. The aerial system (to be described in more detail below) of the unit 14 projects the transmitted radar beam vertically upwards into the radome 16 where it is reflected outwardly in a substantially horizontal direction as indicated by the arrow C, by means of a radar reflector 18, shown dotted within the radome 16. As the assembly comprising the unit 14 and the radome 16 is rotated about its vertical axis, the beam emitted in the direction of the arrow C will scan in a substantially horizontal plane.

Reflected beams produced by targets detected by the transmitted beam are collected by the reflector 18 and reflected on to the receiver portions of the aerial system forming part of the unit 14 and are processed in a manner to be described.

The radome 16 may be made of any suitable material. As it rotates with the unit 14, the transmitted and reflected beams always pass through the same discrete areas of its side wall and therefore only these parts need to be constructed so as not to interfere with the beams.

The electrical connections between the transmitter/receiver unit 14 and the drive unit 12 are required to carry to carry only power supplies to the unit 14 and control signals for the display (which may be in the form of digital signals for example). Therefore, these electrical connections may be implemented by simple slip rings. The display unit (not shown) is mounted separately at any convenient location.

Figure 3:
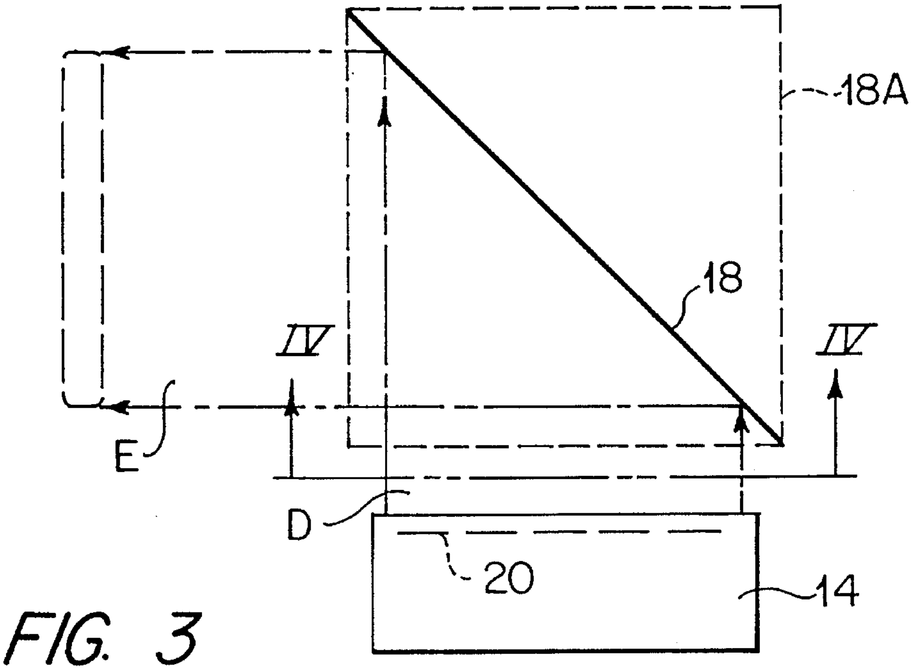
FIG. 3 is a diagrammatic side elevation of part of the arrangement of FIG. 1, when operating in one of its modes.

FIG. 3 shows a diagrammatic and simplified elevation of part of the radar arrangement when operating in the A mode. In FIG. 3, the drive unit 12 and the stand 10 are not shown, and neither is the radome 16.

Figure 4:
FIG. 4 shows the shape of a radar beam in the arrangement of FIG. 3, viewed ion the line IV—IV of FIG. 3.

The transmitting and receiving aerial system of the unit 14 will be described in detail below and is merely indicated diagrammatically at 20 in FIG. 3. It is arranged to emit a radar beam D which is directed vertically upwards to the reflector 18 and shown by the chain line (dashed and dotted). FIG. 4 shows the shape of this beam as viewed on the section line IV—IV of FIG. 3. Therefore, the beam D is reflected horizontally outwardly by the reflector 18 to produce a beam E (FIG. 3) which has Pattern A (FIG. 1). As the unit 14, together with the reflector 18, rotate about the vertical axis, the emitted beam therefore scans the target area. The radar arrangement is therefore operating in the A mode.

Figure 5:
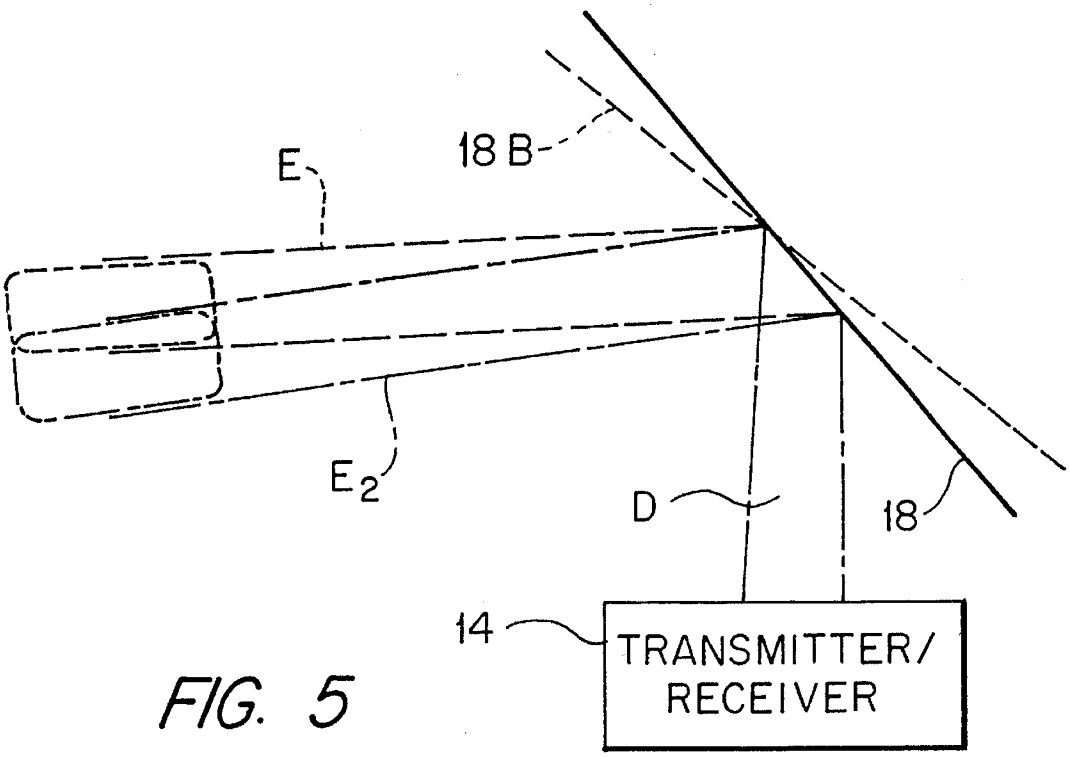
FIG. 5 corresponds to FIG. 3 but shows the arrangement when operating in another of its modes.

In order to switch the radar arrangement into the B mode, the reflector 18 is turned through 90°, about the vertical axis, relative to the unit 14 and therefore assumes the position shown dotted in FIG. 3 at 18A and in full line in FIG. 5. FIG. 5 therefore corresponds to FIG. 3 but shows, first, the reflector 18 moved through 90° relative to the unit 14 (into the dotted position shown in FIG. 3) and, secondly, the unit 14, together with the reflector 18, turned through 90° about the vertical axis relative to the position shown in FIG. 3.

As is apparent from FIG. 5, therefore, the beam D emitted by the aerial system 20 of the unit 14 is now reflected by the reflector 18 so as to produce a beam E which is turned through 90° compared with the beam E of FIG. 3. Therefore, the beam now has the Pattern B of FIG. 1 and the arrangement is therefore operating in the B mode. When the unit 14 and the reflector 18 turn angularly about the vertical axis, the Pattern B beam therefore scans the target area.

In this way, therefore, the radar arrangement can scan the target area in two fundamentally different modes and therefore be able to detect two fundamentally different types of target. Nevertheless, it uses the same transmitting aerial system in both modes, and because of this, and because the beam pattern emitted in each of the modes is optimally suited to the respective type of target, the aerial arrangement has low power requirements and is optimised for each of the target types. This follows in part from the fact that the shape of the beam in each mode is appropriate to the target type and in particular has substantially no more than the minimum aspect ratio required to detect that particular target type. Clearly, a transmitted beam having a circular pattern or cross-section 12° in diameter could be used to detect targets of both of the two types referred to above. However, such a beam would have an excessive width for detecting targets of the first type (high speed aircraft) and an excessive height for detecting targets of the second type (the rotor blades of hovering helicopters). In order to produce such a beam, the arrangement would have to have a much higher power requirement and most of the power would be wasted in producing a beam of unnecessary size and inappropriate shape.

In FIGS. 3 and 4, it is assumed that the reflector 18 is inclined at 45° to the vertical axis. However, this is not essential and the reflector 18 may have different angles of inclination so as to alter the direction of the beam above (or perhaps below) the horizontal.

In fact, in order to improve the detecting capabilities of the arrangement, the detector 18 is arranged to have more than one possible angle of inclination to the horizontal when the arrangement is in the B mode. FIG. 5 shows in dotted outline at 18B how the reflector 18 may be angled at slightly more than 45° to the vertical so as to produce a beam E2 depressed below the horizontal. In a manner to be explained, the radar arrangement is capable of operating in the B mode with the reflector 18 positioned in any one of a number of different angular positions relative to the horizontal axis so as in each one to produce a transmitted beam E having a different elevation. Therefore, the arrangement can carry out a succession of B mode scans in each of which the beam has a different elevation; each of these scans may be separated by an A mode scan.

Figure 6A:
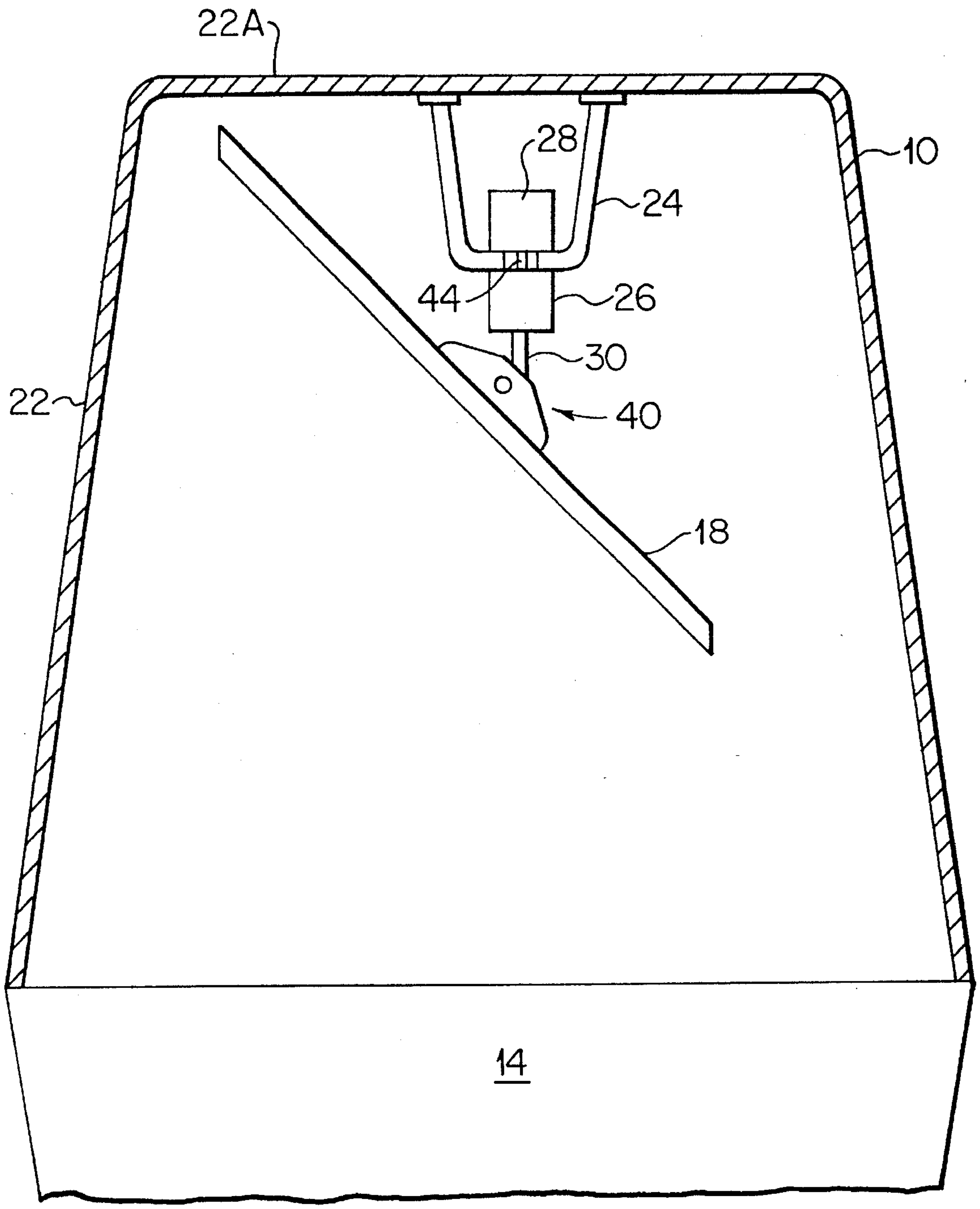
FIGS. 6A and 6B show how a reflector of the arrangement is supported and moved, FIG. 6A being a side view and FIG. 6B a perspective view.
Figure 6B:
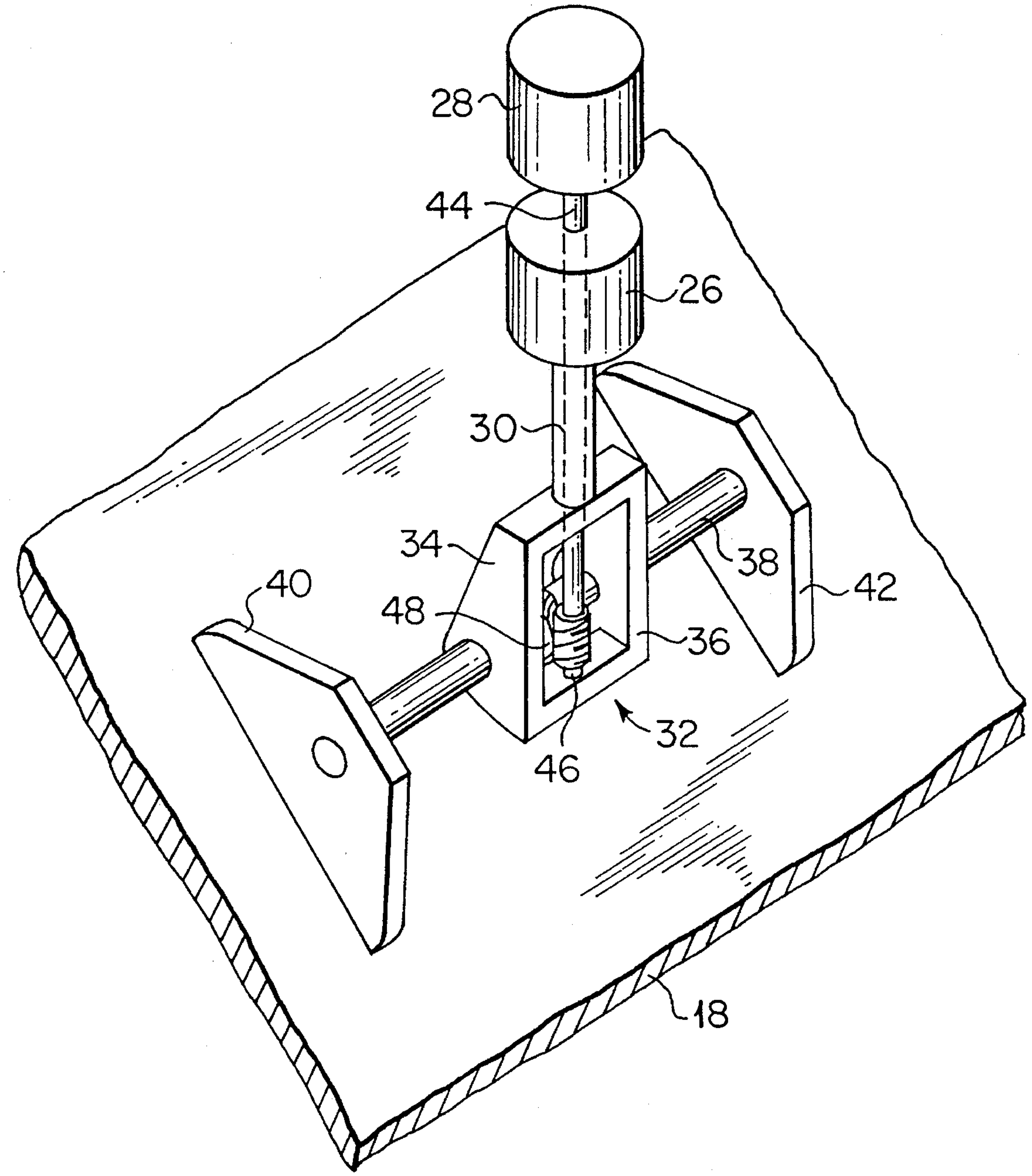

FIGS. 6A and 6B show in more detail one way in which the position of the reflector 18, relative to the transmitter/receiver unit 14, may be varied.

FIGS. 6A and 6B show the supporting framework 22 of the radome 16. From the underside of the upper member 22A of this framework a support structure 24 extends and supports two electrical stepper motors 26 and 28. Motor 26 has a hollow output shaft 30 which terminates at, and is rigidly attached to, a frame 32 (FIG. 6B) on the rear face of the reflector 18. The frame 32 has side flanges 34 and 36 which rotatably support a shaft 38. Opposite ends of the shaft 38 are rigidly attached in wings 40 and 42 fixed to the reflector 18.

The output shaft of the stepper motor 28 is of smaller diameter than the output shaft 30 of the motor 26 and extends through the motor 26 and within its hollow output shaft 30, passing freely through a hole shown dotted in the upper horizontal member of the frame 32. The end of the shaft 44 is supported in a bearing in the lower horizontal member of the frame 32. A worm 46 is rigidly mounted on the shaft 44 and engages a worm wheel 48 rigid with the shaft 38.

It therefore follows that motor 26 controls the position of the reflector 18 with respect to the vertical axis. Therefore, stepping pulses applied to the motor 26 cause the shaft 30 to turn the frame 32 about the vertical axis and such movement swings the shaft 38 and, via the wings 40 and 42, the reflector 18 about the vertical axis.

In contrast, stepping pulses applied to the motor 28 cause the reflector 18 to turn about the horizontal axis. Thus, angular movement of the shaft 44 causes angular movement of the shaft 38, about its own axis, via the intermediary of the worm 46 and the worm wheel 48, the amount of this depending of course on the amount of angular movement of the shaft 44 and the gear ratio between the worm and the wheel.

In operation, stepping pulses are applied to both motors when it is required to switch the radar arrangement from the A mode to the B mode, and vice versa. Thus, in switching from the A mode to the B mode, the required number of stepping pulses is applied to the motor 26 to swing the reflector 18 through 90° about the vertical axis. At the same time, stepping pulses are applied to the motor 28 so as to ensure that the reflector 18 has the required angular relationship to the horizontal axis when it reaches its final position.

The arrangement shown in FIGS. 6A and 6B is particularly suited to digital control. However, various other ways of appropriately repositioning the reflector 18 relative to the transmitter/receiver unit 14 may be used instead.

Advantageously, means may be provided for locking the shafts 30 and 44 against rotation when the motors 26 and 28 are not energised. For example, the shafts may be of square section and solenoid-operated locking jaws may be arranged to be movable into and out of engagement with the shafts.

Clearly, during any period for which the angle of the reflector 18 relative to the vertical and horizontal axes and relative to the transmitter/receiver unit 14, is being altered, the radar arrangement is effectively out of action. It is therefore essential that such positioning of the reflector 18 should take place as rapidly as possible. In part, this is achieved by ensuring that the reflector 18 has a very low inertia. The reflector 18 may, for example, be constructed of lightweight rigid foam material and provided with a reflecting Surface comprising a thin fibreglass layer, for example, covered with copper or aluminium foil. In a particular example, if the reflector is approximately 600 mm square and with a thickness of 10 mm, it may have a weight of less than 300 grams. In addition, however, the use of stepper motors for positioning the reflector enables the form of the pulse trains applied to the motors to be adjusted so as to provide optimum acceleration and deceleration. Initially, the pulse repetition frequency is low and then increases to accelerate the reflector movement to a maximum, decreasing again to bring the reflector to rest with minimum positional overshoot.

It will be apparent that a switch from one mode to the other, entailing angular movement of the reflector 18 through 90° about the vertical axis relative to the unit 14, not only turns the emitted beam through 90° so as to switch between Pattern A to Pattern B, but also shifts the beam through 90° relative to the vertical axis. Therefore, this must be taken into account during the scanning process: when switching from one mode to the other, it is necessary to choose the time instant when reflector 18 is turned through 90° so that the emitted beam is being emitted in the correct direction at the start of the scan in the new mode; in this way, the unit 14 can have a constant rotation rate.

It will also be noted that changing from one mode to the other involves rotation of the beam about a line passing through the center of the beam, not through its edge. Therefor, if the beam is being emitted with its lower edge horiontal in the A mode, it is necessary, when switching into the B mode, to depress the beam by half the dimension h (FIG. 1), that is, by 6° in order to ensure that the beam (now turned through 90°) continues to be emitted with its lower edge horizontal; and a corresponding shift by 6° in the reverse direction is necessary when switching back to the A mode. Therefore, the motor 28 is necessary even if the facility of being able to give the beam various different elevations in the B mode is not required.

Figure 7:
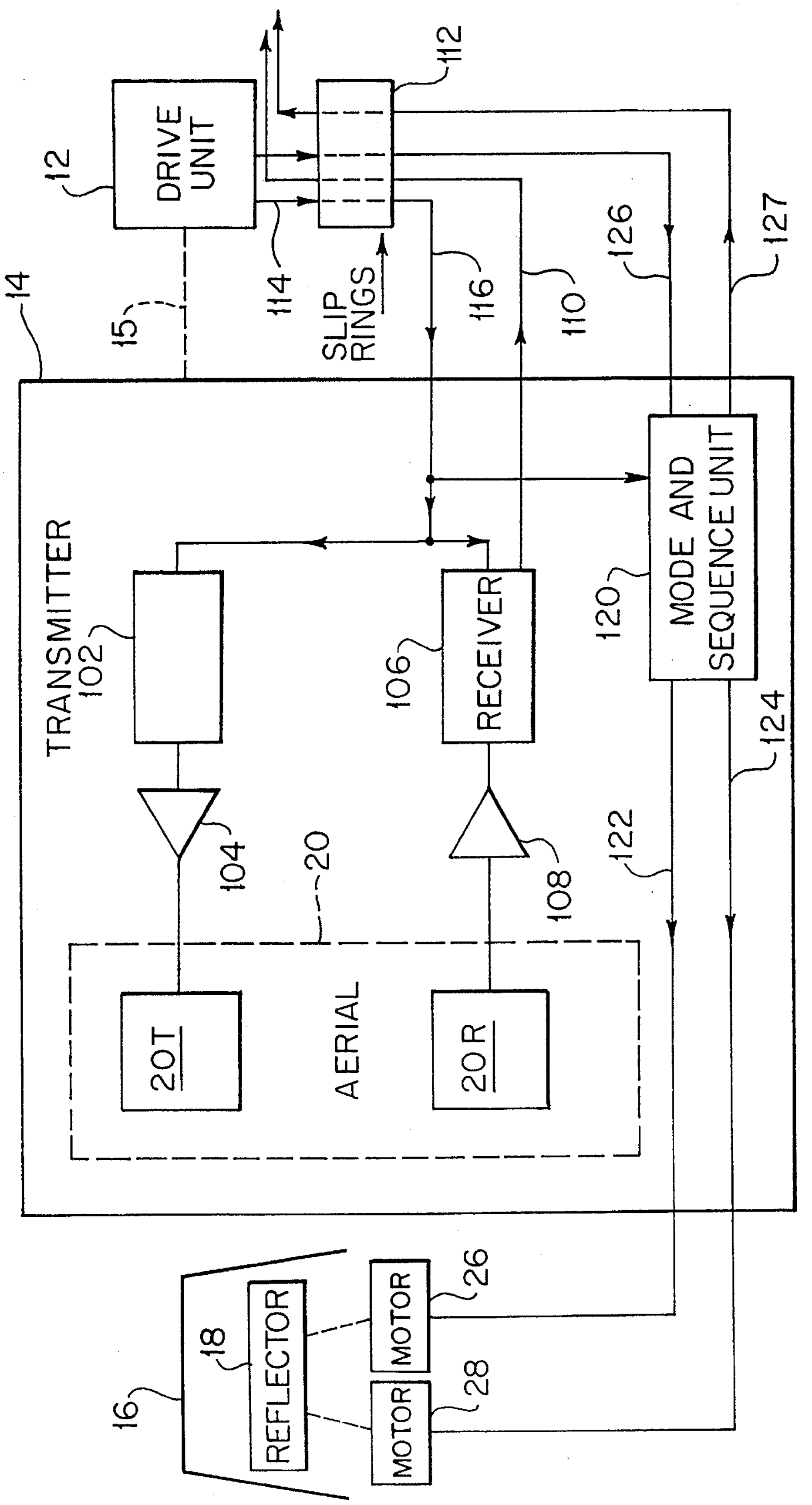
FIG. 7 is a block circuit diagram of the radar arrangement.

FIG. 7 shows a block diagram of the arrangement as so far described.

FIG. 7 shows the drive and display unit 12 with its mechanical connection 15 to the transmitter/receiver unit 14 and the randome 16 carrying the reflector 18.

The aerial system 20 is shown diagrammatically as having a transmitter section 20T and a receiver section 20R. The transmitter section 20T is energised by a transmitter 102 via an output unit 104, and the transmitter section 20T of the aerial produces the output beam of appropriate shape as already described.

Any target reflections are reflected by the reflector 18 onto the receiver section 20R of the aerial system 20 and are fed to a receiver 106 via an input unit 108. In known manner, the receiver 106 processes the reflected signals and these are fed back to the display unit via drive unit 12 and a line 110 and the slip ring connections shown generally at 112, and are displayed by the display unit in an appropriate manner to indicate the target and its bearing.

Power supplies for the circuitry of the transmitter/receiver section 14 are fed from the drive unit 12 via lines 114 and 116 and the slip rings 112 (FIG. 7 does not show the power supply connections to all the circuitry).

The transmitter/receiver section 14 also includes a mode controller and sequence unit 120. This produces output drive pulses on lines 122 and 124 to the stepper motors 26 and 28 which control the angular position of the reflector 18 with respect to both vertical and horizontal axes (in the manner. explained). The mode controller and sequence unit 120 receives signals on a line 126 from the drive unit 12 which represent the angular position of the transmitter/receiver unit 14 with respect to the vertical axis and relative to a datum point. These signals therefore enable the unit 120 to detect the angular position of the reflector with respect to this datum point. The unit 120 incorporates pulse generator circuitry which is programmed so as to emit pulse trains on lines 122 and 124 at appropriate time instants so as to cause the motors 26 and 28 to reposition the reflector 18 and thus switch the arrangement from one mode to the other.

The pulse generation circuitry in the unit 120 may be programmed to arrange the two operating modes in any desired way.

For example, one possible sequence would be for the arrangement to carry out a number of complete 360° scans in the A mode followed by a single 360° scan in the B mode. This sequence would then be repeated. For each one of n B mode scans, the unit 120 would produce different relative numbers of output pulses on lines 122 and 124 so that, for each of these B mode scans, the reflector 18 would have a slightly different angular position relative to the horizontal axis. Therefore, each of these B mode scans would produce a beam having a slightly different angle relative to the horizontal.

Such a sequence, while possible, does mean that for approximately 20% of the total time (ignoring the time taken in repositioning the reflector 18 relative to the unit 14), the arrangement is not effectively detecting for high speed small aspect targets, and for approximately 80% of the total time, the arrangement is not detecting for intermittent slow moving targets. As the targets of the latter type are relatively slow moving, it may normally be satisfactory for them to be searched for during only 20% of the total time. However, it may be less satisactory for the high speed targets to be searched for only during 80% of the total time. If, for example, tile speed of approach of a target of this type is sufficiently high in relation to the total time for a complete 360° scan, such a target could approach and arrive completely undetected while the arrangement was carrying out one of the B mode scans. Of course, this disadvantage could be mitigated by increasing the number of A mode scans relative to the number of B mode scans, but this increases the risk that a target of the intermittent slow-moving type might be undetected.

However, as already explained, switching from one mode to the other automatically produces a step change of 90° in the direction of emission of the beam (assuming that the transmitter/receiver unit 14 is not turened at the same time). This 90° swing of the beam, whose direction will of course depend on the direction, relative to the vertical axis, through which the reflector 18 is turned relative to the unit 14, can be used to produce a more sophisticated mode sequence as will now be explained with reference to FIG. 8.

Figure 8:
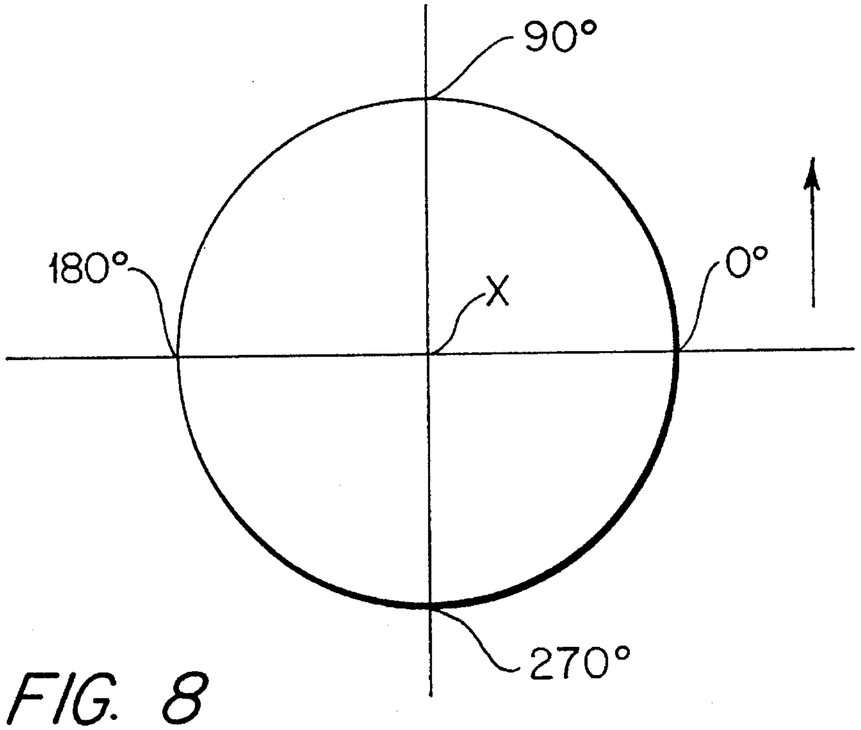
FIG. 8 is a sequence diagram showing how the radar arrangement can switch between different modes to produce a sequence of operations.

In FIG. 8, it is assumed that it is desired to search for targets of the second type within only 180° of the total scan area, that is, "forward" of the radar arrangement which is indicated diagrammatically at X. Initially, it is assumed that the arrangement is such that the emitted beam is being emitted in the 0° direction. With the arrangement operating in the A mode, it carries out a 270° scan in this mode. At this time the unit 120 (FIG. 7) switches the arrangement into B mode, by turning the reflector 18 through 90° about the vertical axis and with respect to the unit 14 (and appropriately adjusting its position relative to the horizontal axis if necessary). This automatically results in a 90° shift in the direction of emission of the transmitted beam with respect to the vertical axis, as explained above, and the emitted beam is now being emitted in the 0° direction again. From this position, the arrangement performs a B mode scan to the 90° position. The arrangement is then switched back into A mode by again shifting the reflector 18 through 90° about the vertical axis and relative to the unit 14, and this time the direction of movement is such as to shift the emitted beam back to the 0° position. The arrangement then carries out an A mode scan to the 180° position. At this position, the arrangement is then switched back into the B mode so that the emitted beam shifts back to the 90° position from where it scans in the B mode until the 180° position is reached. The arrangement is then switched into the A mode so as to shift the beam forward to the 270° position. From this position, the arrangement can carry out an A mode scan, or several such scans, until, when the beam is again at the 270° position, the arrangement is switched into the B mode and the sequence described above repeats.

The foregoing assumes that the shift between the two modes takes place instantaneously, which will not be the case in practice. Therefore, the shift time will have to be allowed for in the sequence, that is, allowance will have to be made for the fact that the unit 14 will rotate through a finite angle θ while the reflector 18 is switching between its two positions such as by reducing the total angular lengths of the scans in each mode by 2 θ.

It will be appreciated that the foregoing is merely one example of a large variety of different forms of scan which can be used, and in practice an appropriate scan sequence would be chosen to suit the operational conditions.

The mode controller and the sequence unit 120 may also be arranged to be operated manually from a suitable control on the drive unit 12 so that an operator can switch the arrangement from one mode to the other if he wishes.

The display produced on the display unit may be in any suitable form. For use in the field, a simplified form of display, incorporating lights for example and indicating merely the position of detected targets, may be provided; advantageously, such a display will be controlled by signals recieved on a line 127 from the unit 120 so as also to indicate the operating mode in which each such target was detected, so as therefore to indicate the particular target type.

Figure 9:
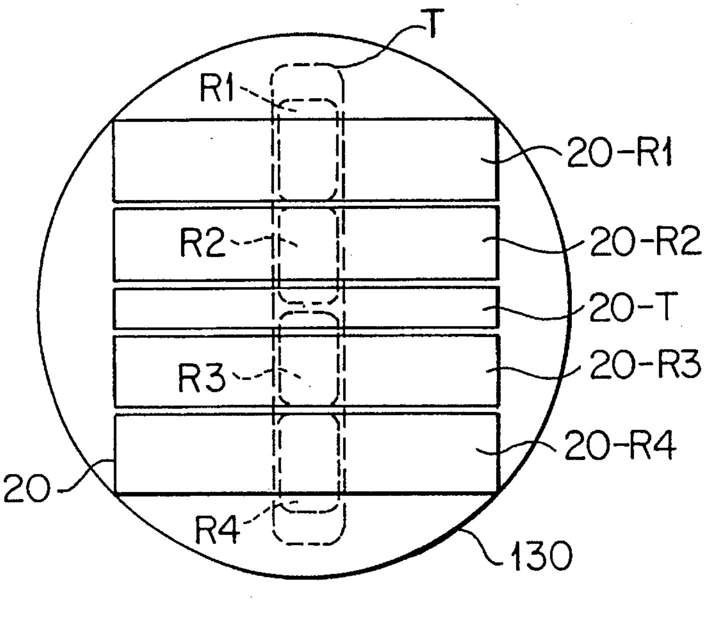
FIG. 9 is a plan view of the transmitting and receiving aerial system of the arrangement as viewed on the line IX—IX of FIG. 2.

FIG. 9 is a diagrammatic section on the line IX—IX of FIG. 2 showing one way in which the transmitting and receiving system 20 may be arranged. The aerial 20 may be mounted on a support 130 having a diameter of, say, 500 mm. The transmitting section 20A of the aerial is positioned along a diameter of the circle and of narrow elongated form so as to produce the required beam shape shown dotted at T.

In order to make optimum use of the available area in the aerial support 130,: the receiving part of the aerial is arranged in four sections, shown at 20-R1, 20-R2, 20-R3 and 20-R4. These therefore respectively produce receiving patterns shown dotted at R1, R2, R3 and R4 and therefore in total produce a response pattern corresponding to the shape of the transmitted beam pattern.

Figure 10:
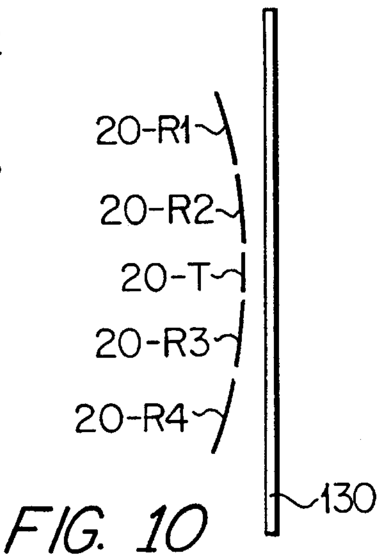
FIG. 10 is a diagrammatic side view of the aerial system of FIG. 9.

FIG. 10 shows how the transmitting and receiving sections of the aerial are appropriately angled with respect to each other. In this way, the beams are made to converge in the region of the reflector 18.

Figure 11:
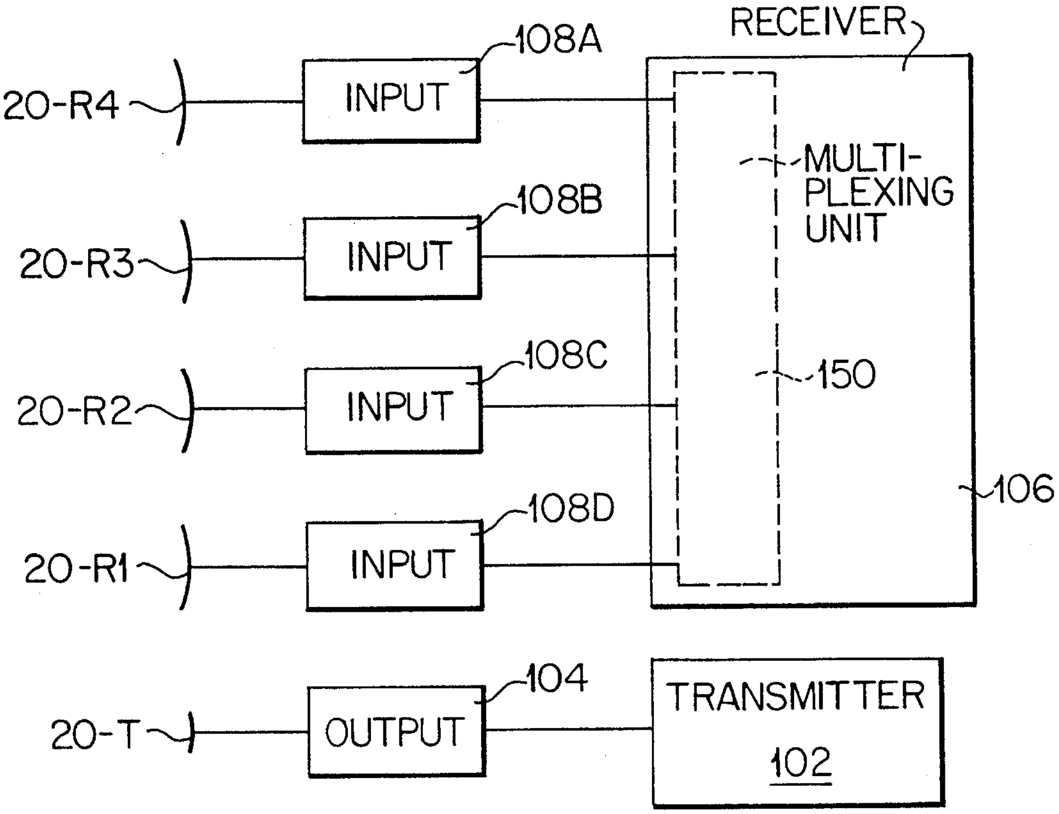
FIG. 11 is a block circuit diagram of the circuitry associated with the aerial system of FIGS. 9 and 10.

FIG. 11 shows how the four receiving sections 20-R1, 20-R2, 20-R3 and 20-R4 can be respectively connected through receiver input units 108A, 108B, 108C and 108D to a multiplexing unit 150 within the receiver processing circuitry 106 of FIG. 8.

The reflector 18 must be capable of reflecting the beam in each of its 90°-spaced orientations and this therefore governs its overall dimensions; in effect, its diameter must be at least as great as the largest dimension (see FIG. 1) of the beam. This fact governs the size of the equipment and, in particular, the space available for the aerials. As the beam width of an aerial is inversely dependent on its aperture, a single receiving aerial of substantially the same size as the aerial support 130 would have a small beam size—whose two dimensions would each be substantially equal to the smallest beam dimension. This would therefore be unsatisfactory. The multiple receiving aerials shown overcome this problem because together they make use of substantially all the space on the aerial support 130 and produce receiving patterns which together cover the whole of the transmitted beam. At the same time, each receiving aerial has a size four times as great as the maximum size which a single receiving aerial could have in order to receive the whole of the reflected beam. As the size of a receiving aerial determines the strength of the received signal (which in turn determines the sensitivity of the system), each of the four receiver input units receives a signal strength four times as great as would a single receiver connected to the single receiving aerial. Therefore, the arrangement provides a four-fold increase in sensitivity without increase in overall equipment size.

The arrangement is not limited to the detection of targets of the two types described. It could for example be used at sea to detect ships when in the B mode.

What is claimed is:

1. A radar arrangement including means for emitting a radar beam of a first predetermined shape, a reflector for reflecting the beam into a target area, and means for rotating said reflector relative to said emitting means so as to produce in different relative orientations of the emitting means and reflector, two radar beams which have substantially the same size and said first predetermined shape but different orientations relative to the emitting means.

2. An arrangement according to claim 1, in which said first predetermined shape is a narrow shape elongate along a first axis, and said relative rotation of the emitting means and reflector produces one said beam in which the first axis is substantially vertical in the target area, and another said beam in which said first axis is substantially horizontal in the target area.

3. A radar arrangement comprising a single transmitting aerial system emitting a radar beam of narrow elongate shape, a reflector for reflecting the beam into a target area, means for turning the aerial and the reflector bodily together to scan the emitted beam through at least part of the said area, and means for turning the reflector relative to the aerial system so as to turn the reflected beam between two positions and switch the arrangement between corresponding operating modes.

4. An arrangement according to claim 3, in which the aerial system is mounted for turning with its energisation circuitry to which no high frequency connections are made.

5. An arrangement according to claim 3, in which the aerial system and the reflector are mounted for bodily rotation about the same axis as the axis through which the reflector is movable relative to the aerial system.

6. An arrangement according to claim 5, in which the aerial system is arranged symmetrically with respect to the said axis so as to emit the said beam in the direction of the axis, and comprising controllable mounting means mounting the reflector on the said axis so as to receive the emitted beam, the reflector having its reflecting surface inclined to the said axis by being turned about a second axis normal to that axis whereby the reflected beam is reflected in the direction of a third axis substantially normal to both the first and second axes.

7. An arrangement according to claim 6, in which the mounting means is arranged to turn the reflector through substantially 90° about the first axis with respect to the transmitting aerial system whereby to switch the arrangement between the two operating modes.

8. An arrangement to claim 6, in which the controllable mounting means includes means operative to control the angular position of the reflector relative to the said second axis, and relative to the aerial system, so as to adjust the angle (if any) between the direction of the reflected beam and the third axis.

9. An arrangement according to claim 6, in which the controllable mounting means comprises support means supporting the reflector for angular movement with respect to the first and second axes, and first and second electric motors respectively connected to turn the reflector about these two axes.

10. An arrangement according to claim 9, in which the support means includes a frame carrying a control shaft which is aligned with the said second axis and which is rigidly connected to the reflector so that angular movement of the frame about the first axis turns the reflector thereabout, the control shaft being rotatable relative to the second axis so that such rotation turns the reflector about that axis.

11. An arrangement according to claim 10, in which the two motors are arranged so that the output shaft of one of them turns the frame about the first axis and the output shaft of the other turns the said control shaft about the second axis.

12. An arrangement according to claim 11, in which the output shaft of the first motor is hollow, mounted in alignment with the said first axis and rigidly connected to the frame, and the output shaft of the second motor is mounted inside, and freely rotatable relative to, the output shaft of the first motor and extends through the frame and be drivingly connected to the said control shaft by gearing.

13. An arrangement according to claim 12, in which the gearing is a worm and wheel gearing.

14. An arrangement according to claim 9, in which the motors are stepper motors.

15. An arrangement according to claim 3, in which the transmitting aerial system has associated with it a receiving aerial system on to which reflections from targets in the target area are reflected by the reflector.

16. An arrangement according to claim 15, in which the receiving aerial system comprises a plurality of separate receiving aerials whose respective beam patterns each correspond to part only of the area of the transmitted beam pattern.

17. A radar arrangement comprising a base, mechanical driving means mounted on the base, a transmitter/receiver unit mounted on the base so as to be angularly movable relative to the base by the driving means about a first axis which is vertical when the base is standing on a horizontal plane, there being no high frequency connections to the transmitter/receiver, a transmitting and receiving aerial system mounted on and rotating with the transmitter/receiver unit and arranged to emit a radar beam which is of predetermined elongate shape in cross-section, a reflector, mounting means mounting the reflector above the aerial system and at an angle both to the vertical and horizontal axes so as to receive the emitted beam and to reflect it in a generally horizontal direction into a target area, the mounting means mounting the reflector so that it turns bodily with the angular movement of the transmitter/receiver unit about the vertical axis and thereby scans the reflected beam through the target area and being also capable of turning the reflector through substantially 90° with respect to the vertical axis and relative to the aerial system whereby to turn the reflected beam through a corresponding angle and thereby to switch the radar arrangement between first and second operating modes.

18. An arrangement according to claim 17, in which the mounting means also includes means operative when it turns the reflector through substantially 90° with respect to the vertical axis and relative to the transmitter/receiver unit to carry out a simultaneous shift about the horizontal axis and with respect to the aerial system so as to make a corresponding shift in the direction of emission of the reflected beam.

19. An arrangement according to claim 17, in which the reflector is a planar reflector.

20. An arrangement according to claim 17, including a radome enclosing the reflector and mounted above the aerial system for rotation therewith about the vertical axis, and in which the mounting means comprises first and second stepper motors supported from the radome above the reflector and with their output shafts extending in alignment with each other and with the vertical axis, the output shaft of the first motor being hollow and rigid with a frame which carries a control shaft rotatable about the horizontal axis and rigidly connected to the reflector so that angular movement of the output shaft of the first motor turns the frame and thus the reflector about the vertical axis, and the output shaft of the second motor passing freely through the hollow output shaft of the first motor and being geared to the said control shaft whereby to turn that shaft about the horizontal axis and thereby turn the reflector about that axis.

21. An arrangement according to claim 17, in which the aerial system incorporates a plurality of separate receiving sections which are respectively shaped and positioned so as to have response patterns each covering part only of the total area of the pattern of the emitted beam.

22. A method of detecting first and second types of target within a predetermined target area, comprising the steps of emitting a radar beam of predetermined elongate cross-sectional shape onto a reflector which reflects the beam into the target area with the beam having a first predetermined orientation with respect to the target area, turning the emitted beam and the reflector bodily together about a predetermined axis so as to scan the reflected beam through at least part of the target area, shifting the reflector relative to the emitted beam by a predetermined angular distance with respect to an axis aligned with the emitted beam so as to give the reflected beam a second, different, predetermined orientation with respect to the target area, and then moving the emitted beam and the reflector bodily together again about the said axis so as to scan the reflected beam through at least part of the target area, the first and second predetermined orientations of the beam with respect to the target areas being suited to detect targets of the first and second types respectively.

* * * * *

UNITED STATES PATENT AND TRADEMARK OFFICE

CERTIFICATE OF CORRECTION

PATENT NO. : 5,477,224

DATED : December 19, 1995

INVENTOR(S) : SINNOCK, Peter J.

It is certified that error appears in the above-indentified patent and that said Letters Patent is hereby corrected as shown below:

Title page, item [73] should read as follows:

-- [73] Assignee: Racal Defence Radar and Displays Limited, Berkshire, England --

Signed and Sealed this

Seventeenth Day of June, 1997

Attest:

BRUCE LEHMAN

*Attesting Officer* *Commissioner of Patents and Trademarks*